United States Patent
Sen et al.

(10) Patent No.: US 9,148,847 B2
(45) Date of Patent: Sep. 29, 2015

(54) MOBILE DEVICE-INITIATED INTER-RADIO ACCESS TECHNOLOGY HANDOVERS BETWEEN NETWORKS

(75) Inventors: Abhishek Sen, San Jose, CA (US); Anush G. Nadathur, San Jose, CA (US); Madhusudan Chaudhary, Campbell, CA (US); Matthew S. Klahn, San Francisco, CA (US); Sang Ho Baek, Palo Alto, CA (US); Vikram B. Yerrabommanahalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 13/610,315

(22) Filed: Sep. 11, 2012

(65) Prior Publication Data

US 2013/0279470 A1 Oct. 24, 2013

Related U.S. Application Data

(60) Provisional application No. 61/636,355, filed on Apr. 20, 2012.

(51) Int. Cl.
*H04W 4/00* (2009.01)
*H04W 48/18* (2009.01)
*H04W 36/30* (2009.01)
*H04W 80/04* (2009.01)

(52) U.S. Cl.
CPC .............. *H04W 48/18* (2013.01); *H04W 36/30* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 8,199,719 | B2 * | 6/2012 | Taneja | 370/331 |
| 2007/0263574 | A1 * | 11/2007 | Lu et al. | 370/338 |
| 2008/0188223 | A1 * | 8/2008 | Vesterinen et al. | 455/436 |
| 2009/0191862 | A1 * | 7/2009 | Amirijoo et al. | 455/424 |
| 2009/0232097 | A1 * | 9/2009 | Taneja | 370/331 |
| 2010/0128608 | A1 * | 5/2010 | Zou et al. | 370/237 |

(Continued)

FOREIGN PATENT DOCUMENTS

WO 2008044215 4/2008

OTHER PUBLICATIONS

International Search Report and Written Opinion from PCT/US2013/035705, dated Sep. 24, 2013, Apple Inc., pp. 1-12.
3rd Generation Partnership Project 2, "E-UTRAN-eHRPD Connectivity and Interworking: Core Network Aspects", Apr. 2011, pp. 1-269.

(Continued)

*Primary Examiner* — Bob Phunkulh
(74) *Attorney, Agent, or Firm* — Meyertons, Hood, Kivlin, Kowert & Goetzel, P.C.

(57) ABSTRACT

A method for implementing mobile device-initiated inter-radio access technology (I-RAT) handovers between networks includes a wireless device communicating with a first network using an internet protocol (IP) address that was received from the first network during an initial attachment procedure. The wireless device may initiate an I-RAT handover procedure to connect to a second wireless network using a configuration message that includes a handover attach type. Once the connection with the second network is established, the wireless device may receive the information from the second wireless network using the same IP address. The wireless device may force the wireless device into dormancy and prevent data transfer, and initiate another I-RAT handover procedure to upgrade and connect to the first network, by sending an attach request message that includes a handover attach type.

19 Claims, 4 Drawing Sheets

(56) References Cited

U.S. PATENT DOCUMENTS

| | | | |
|---|---|---|---|
| 2011/0051683 A1 | 3/2011 | Ramankutty et al. | |
| 2011/0090866 A1* | 4/2011 | Yang | 370/331 |
| 2011/0176430 A1* | 7/2011 | Zetterberg et al. | 370/242 |
| 2011/0194530 A1* | 8/2011 | Tinnakornsrisuphap et al. | 370/331 |
| 2012/0127956 A1* | 5/2012 | Wang et al. | 370/331 |
| 2012/0172034 A1* | 7/2012 | Yu et al. | 455/426.1 |
| 2012/0218922 A1* | 8/2012 | Klingenbrunn et al. | 370/280 |
| 2012/0218971 A1* | 8/2012 | Chilla et al. | 370/331 |
| 2012/0294278 A1* | 11/2012 | Wang et al. | 370/331 |
| 2013/0017805 A1* | 1/2013 | Andre--Jonsson et al. | 455/411 |
| 2013/0094471 A1* | 4/2013 | Zhao et al. | 370/331 |
| 2013/0163510 A1* | 6/2013 | Chakravarthy et al. | 370/328 |

OTHER PUBLICATIONS

3rd Generation Partnership Project; Technical Specification Group Services and System Aspects, General Packet Radio Service (GPRS) Enhancements for Evolved Universal Terrestrial Radio Access Network (E-UTRAN) Access (Release 11), Mar. 8, 2012, pp. 1-284.
3rd Generation Partnership Project; Technical Specification Group Services and System Aspects, Architecture Enhancements for non-3GPP Accesses (Release 11), Mar. 14, 2012, pp. 1-250.
International Preliminary Report on Patentability from PCT/US2013/035705, issued Oct. 30, 2014, Apple Inc., pp. 1-9.
Office Action from Taiwanese Application No. 102114064, mailed Oct. 22, 2014, English and Chinese versions, pp. 1-12.

* cited by examiner

MOBILE DEVICE-INITIATED INTER-RADIO ACCESS TECHNOLOGY HANDOVERS BETWEEN NETWORKS

PRIORITY CLAIM

The present application claims benefit of priority to U.S. Provisional Application No. 61/636,355 entitled "Mobile Device-Initiated Inter-Radio Access Technology Handovers Between Networks" filed on Apr. 20, 2012, whose inventors are Abhishek Sen, Anush G. Nadathur, Madhusudan Chaudhary, Matthew S. Klahn, Sang Ho Back, and Vikram B. Yerrabommnanahalli, and which is herein incorporated by reference in its entirety.

BACKGROUND

1. Technical Field

This disclosure relates to wireless communication devices, and more particularly to wireless devices initiating inter-radio access technology handovers.

2. Description of the Related Art

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. A representative wireless network may include simultaneous support for the $3^{rd}$ Generation Partnership Project (3GPP) Long Term Evolution (LTE) wireless communication standard (which may be referred to as a $4^{th}$ generation (4G) network) as well as other 3GPP, and 3GPP2 wireless communication standards such as the Enhanced High Rate Packet Data (eHRPD), for example. This representative "simultaneous" wireless network may support circuit switched voice connections through a first wireless network that may use, for example, the CDMA2000 1x wireless communication protocol and packet switched connections (voice or data) through a second wireless network that uses, for example, the LIT wireless communication protocol. The 3GPP wireless communications standards organization develops mobile communication standards that include releases for Global System for Mobile Communications (GSM), General Packet Radio Service (GPRS), Universal Mobile Telecommunications System (UMTS), LTE and LTE Advanced standards. The 3GPP2 wireless communications standards organization develops mobile communication standards that include CDMA2000 1xRTT and 1xEV-DO, and eHRPD standards.

Some mobile wireless, or user equipment (UE) devices may include functionality to seamlessly transition from one radio access technology to another using various cell selection or handover procedures. When that transition is between RATs from different technologies, it is referred to as an Inter-RAT (I-RAT) handover. Conventionally, I-RAT handovers may be initiated by the network or base station to which the UE is communicating. In many cases, the base station may make a determination based upon information and measurements received from the mobile device, and the base station initiates the handover.

However, there may be issues that arise when the UE is transitioned to a given RAT. For example, although a 4G network may be available to the UE, it may not be preferable for reasons such as power consumption, for the UE to transition or upgrade to the 4G network. Similarly, it may not be preferable to stay idly connected in a 4G network, when a suitable 3G network is available.

SUMMARY OF THE EMBODIMENTS

Various embodiments of a method for implementing mobile device-initiated inter-radio access technology (I-RAT) handovers between networks are disclosed. Broadly speaking, a method is contemplated in which a wireless mobile device may be operating in a state (e.g., idle state) in which it is receiving information such as control information, for example, on a connection with a first wireless network.

In one embodiment, the first wireless network may support the $3^{rd}$ Generation Partnership Project (3G PP) Long Term Evolution (LTE) wireless communication standard. The wireless mobile device may communicate with the first wireless network using an internet protocol (IP) address that was received from the first wireless network during an initial attachment procedure. The wireless mobile device may determine, based upon a given set of parameters (e.g., power consumption), that a downgrade to a connection with a second network with a second radio access technology may be required. In one embodiment, the second wireless network may support the 3GPP2 Enhanced High Rate Packet Data (eHRPD) wireless communication standard, or the Universal Mobile Telecommunications System (UMTS) wireless communication standard. As such, the wireless mobile device may initiate an inter-radio access technology (I-RAT) handover procedure to connect to the second wireless network using a configuration message that includes an attach type that corresponds to a handover. The wireless mobile device may not initiate a detach procedure with the first wireless network before establishing the connection with the second wireless network. Once the connection with the second wireless network is established, the wireless mobile device may receive the information from the second wireless network using the same IP address. While connected to the second wireless network, a data access request may be initiated on the wireless device. For example, a user may activate a given application on the wireless device. Responsively, the wireless mobile device may force the wireless device into dormancy and prevent data transfer, and initiate another I-RAT handover procedure to upgrade and connect to the first wireless network. The wireless mobile device may access the data through the first wireless network.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure.

Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, wireless networks may initiate I-RAT handovers for a variety of reasons. Typically, the network may receive information from the wireless device that is analyzed by the network, and the network makes the decision to initiate the handover. However, there is no provision for the wireless device to initiate such a handover, and to keep the same IP address that was initially obtained. Thus to maintain the same IP address across networks during a device-initiated I-RAT handover, in the following embodiments of FIG. 1 through FIG. 4, a wireless communication system and device are described in which the wireless device may initiate the handover to a new network while keeping the same IP address. It is noted that the term handover is typically used to describe transitions during active data transfers, and the phrase cell selection/re-selection is typically used to describe transitions that occur when the wireless device is idle. However, as used herein, the term handover as it relates to I-RAT handovers may refer generally to either type of transition, whether active or idle.

Figure 1:
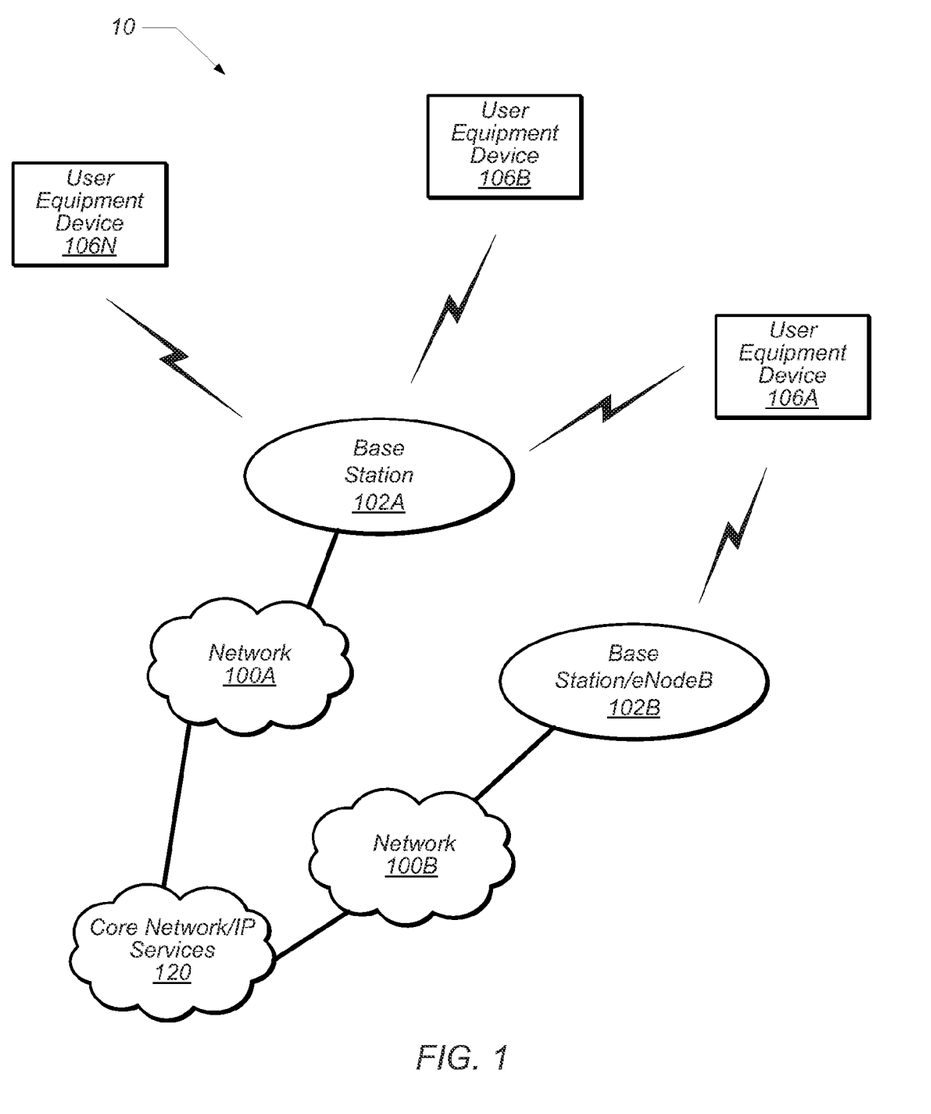
FIG. 1 is a block diagram of one embodiment of a wireless communication system.

Turning now to FIG. 1, a block diagram of one embodiment of a wireless communication system is shown. It is noted that the system of FIG. 1 is merely one example of any of a variety of wireless communication systems. The wireless communication system 10 includes a base station 102A which communicates over a wireless transmission medium (as indicated by the zigzag) (e.g., over the air interface) with one or more user equipment (UE) devices (e.g., 106A through 106N). The base station 102A is also coupled a network 100A via another interface, which may be wired or wireless. The wireless communication system 10 also includes a base station 102B which communicates over the wireless transmission medium (also indicated by the zigzag) with one or more user equipment (UE) device (e.g., 106A). The base station 102B is also coupled a network 100B via another interface, which may be wired or wireless. In the illustrated embodiment, the networks 100A and 100B are coupled to an Internet Protocol (IP) services network 120. It is noted that components identified by reference designators that include both a number and a letter may be referred to by the number only where appropriate.

The base station 102A may be representative of a base transceiver station (BTS) or cell site, and may include hardware that enables wireless communication with one or more of the UEs 106 using a particular radio access technology (RAT). The base station 102A may also be equipped to communicate with the network 100. Thus, the base station 102A may facilitate communication between the UEs 106 and/or between the UEs 106 and the network 100. The communication area (or coverage area) of the base station 102A may be referred to as a "cell." In one embodiment, the base station 102A may be representative of a base station supporting RATs such as the eHRPD RAT. Accordingly, network 100A may be representative of an eHRPD core network. In contrast, the base station 102B may representative of an eNodeB, which may support a RAT or RATs such as LTE and/or LTE Advanced (UTE-A), for example. Thus, the network 100B may be representative of an LTE core network. In various embodiments, the base stations 102 and the UEs 106 may be configured to communicate over the transmission medium using any of various wireless communication radio access technologies such as LTE, LTE-A, eHRPD, UMTS, GSM, CDMA, WLL, WAN, WiFi, WiMAX, etc.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor (shown in FIG. 2) that is configured to execute program instructions stored in a memory (also shown in FIG. 2). Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

As described further below in conjunction with the descriptions of FIG. 2 through FIG. 4, in some embodiments, the UE 106 may be configured to initiate a connection to one wireless network that implements one radio access technology such as LTE, for example, and obtain an IP address. The UE 106 may determine, based upon a given set of parameters (e.g., power consumption), that a downgrade to a connection with a second network that supports a second radio access technology such as eHRPD, for example, may be desirable. The UE 106 may initiate an I-RAT handover procedure to connect to the second wireless network using a configuration message that includes an attach type that corresponds to a handover. Once the connection with the second wireless network is established, the UE 106 may receive the information from the second wireless network using the same IP address. While connected to the second wireless network, a data access request may be initiated on the UE 106. In response, UE 106 may inhibit data transfer, and initiate another I-RAT handover procedure to connect to the first wireless network. The UE 106 may access the data through the first wireless network using the same IP address.

Figure 2:
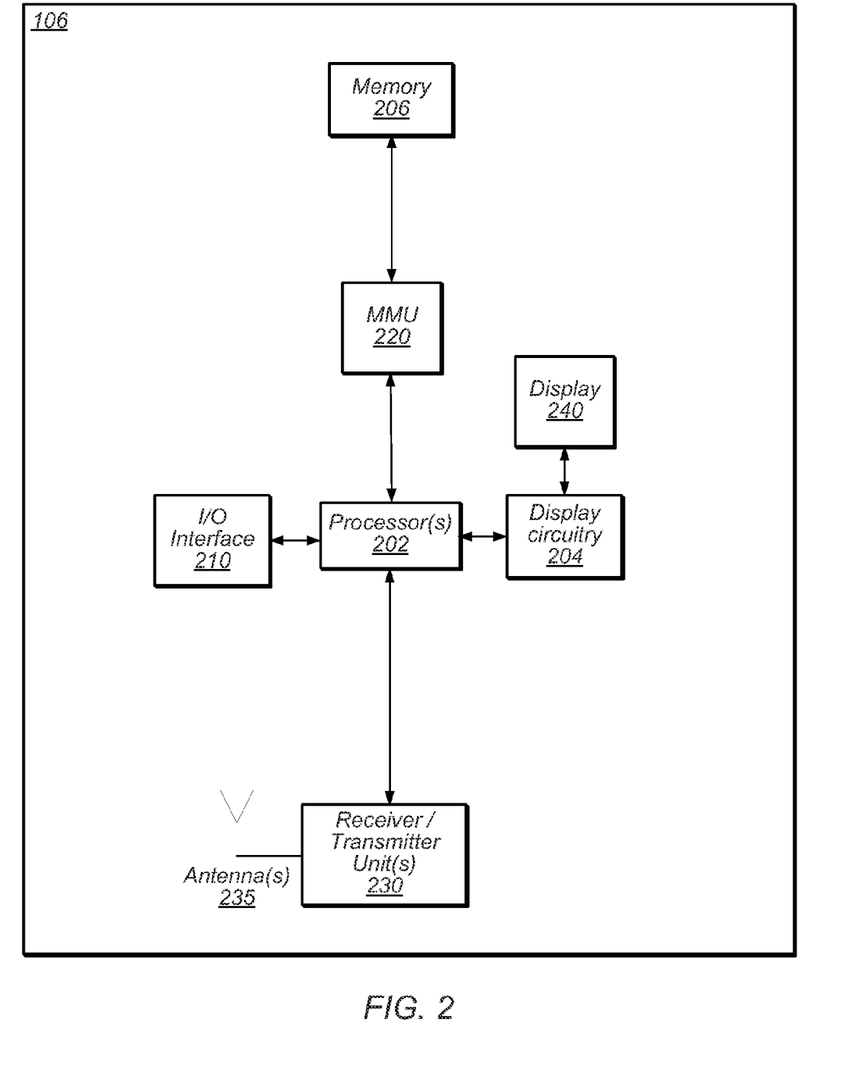
FIG. 2 is a block diagram of one embodiment of a wireless communication device shown in FIG. 1.

Referring to FIG. 2, a block diagram of one embodiment of a user equipment device shown in FIG. 1 is shown. It is noted that components that correspond to components shown in FIG. 1 are numbered identically for clarity and simplicity. The UE 106 includes processor(s) 202 (or processor core(s) 202) which is coupled to display circuitry 204 which is in turn coupled to the display 240. The processor(s) 202 is also coupled to a memory management unit (MMU) 220 and to a receiver/transmitter (R/T) unit(s) 230. The MMU 220 is coupled to a memory 206. The UE 106 also includes an I/O interface 210 that is coupled to the processor(s) 202, and may be used for coupling the UE 106 to a computer system, power source, or other external device. It is noted that in one embodiment the components shown within UE 106 of FIG. 2 may be manufactured as stand alone components. However, it is contemplated that in other embodiments various ones of the components may be part of one or more chipsets, or they may be part of a system on chip (SOC) implementation.

In various embodiments, the processors 202 may be representative of a number of different types of processors that may be found in a wireless communications device. For example, processor(s) 202 may include general processing capability, digital signal processing capability, as well as hardware accelerator functionality, as desired. The processor(s) 202 may include baseband processing and therefore may digitally process the signals received by the R/T unit 230. The processor(s) 202 may also process data that may be transmitted by the R/T unit 230. The processor(s) 202 may also perform a number of other data processing functions such as running the operating system (OS) and user applications for the UE 106.

In one embodiment, the MMU 220 may be configured to receive addresses from the processor(s) 202 and to translate those addresses to locations in memory (e.g., memory 206) and/or to other circuits or devices, such as the display circuitry 204, R/T unit 230, and/or display 240. The MMU 220 may also return data to the processor(s) 202 from the locations in memory 206. The MMU 220 may be configured to perform memory protection and page table translation or set up. In some embodiments, the MMU 220 may be included as a portion of the processor(s) 202. The display circuit 204 may be configured to perform graphics processing and provide display signals to the display 240.

The R/T unit 230 may, in one embodiment, include analog radio frequency (RF) circuitry for receiving and transmitting RF signals via the antenna(s) 235 to perform the wireless communication via the over-the-air (OTA) interface. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of RATs, the R/T unit 230 may include a corresponding number of RF front end portions to receive and down-convert, as well as up-convert and transmit the respective RF signals of each technology. For example, in one specific implementation, the R/T unit 230 may include an LTE front end, an eHRPD front end, and/or a UMTS front end.

In various embodiments, the processor(s) 202 may execute software instructions stored with a memory such as memory 206, for example, to perform functionality associated with handover procedures as mentioned above, and described further below. Accordingly, memory 206 may be representative of any type of non-transitory computer readable storage medium or device such as any device in the random access memory (RAM) family of devices, for example. Additionally, the software instructions may be stored on a portable/removable storage media and transferred to memory 206. In other embodiments however, the UE 106 may include hardware associated with the processor(s) 202 and/or the R/T 230 to perform functionality associated with the handover procedures as mentioned above. In still other embodiments, the UE 106 may include any suitable combination of hardware, firmware and/or software to perform functionality associated with the handover procedures as mentioned above, and described further below in conjunction with the description of FIG. 3 and FIG. 4.

Figure 3:
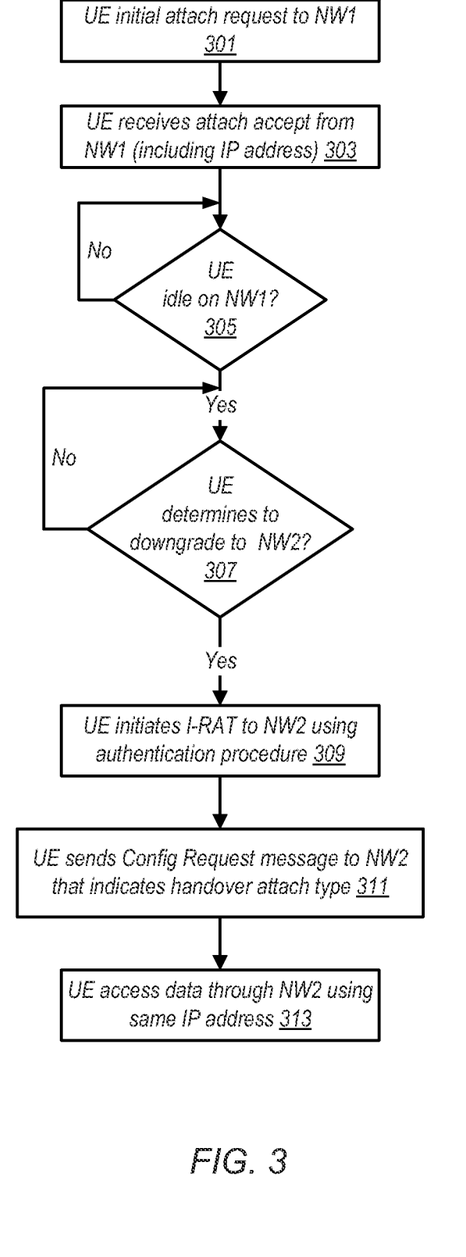
FIG. 3 is a flow diagram depicting the handover operation of one embodiment of the wireless user equipment device shown in FIG. 2.

In FIG. 3, a flow diagram depicting the I-RAT handover operation of one embodiment of the wireless user equipment device shown in FIG. 2 is shown. More particularly, in FIG. 3, a device-initiated downgrade handover procedure is described, Referring collectively to FIG. 1 through FIG. 3 and beginning in block 301 of FIG. 3, the UE 106 may initiate a connection with a first wireless network (e.g., NW1). In embodiments in which the first network is an LTE network (e.g. 100B of FIG. 1), the UE 106 may initiate the connection using a connection request message such as a radio resource control (RRC) message that includes an initial attach request. The first network may respond with, and the UE 106 may receive, an RRC connection setup message, for example, that includes an IP address (block 303). It is noted that the RRC messages are described in more detail in the 3GPP Technical Specification 36.331 version 11, which is herein incorporated by reference in its entirety.

Once the UE 106 establishes the connection, the UE 106 may at some point go to an idle state. For example, a user may not be actively transferring data. In such a case, the UE 106 may continue to maintain the connection to the network, but may not transmit information, except as necessary. In this state, the UE 106 may receive information on one or more control channels. This is sometimes referred to as "listening" to or "camping" on a connection. The processor(s) 202 may be configured to monitor activity within UE 106, and may, in one embodiment, determine that the UE 106 has been idle and/or camping for longer than a predetermined amount of time (block 305). For example, UE 106 may consume more power when in the idle state and camping on an LTE connection than if UE 106 were in the idle state and camping on, for example, an eHRPD or UMTS connection.

The processor(s) 202 may determine that a downgrade handover to a network with a different RAT may be desirable (block 307). Thus, the UE 106 may be configured to initiate an I-RAT handover to another network (e.g., NW2) that uses a different RAT (block 309). More particularly, in one embodiment, the UE 106 may scan for another network such as a network (e.g., 100A of FIG. 1), which uses the eHRPD or UMTS RAT to determine if such a network is available. In one embodiment, upon finding a suitable network, the UE 106 may participate in an authentication procedure that follows a protocol such as the Extensible Authentication Protocol—Authentication and Key Agreement (EAP-AKA) protocol, for example. It is noted that before initiating the I-RAT handover procedure and prior to scanning for a network, the UE 106 may access pre-harvested network information as described further below in conjunction with the description of block 403 of FIG. 4 to determine if an appropriate network is even available.

Once the authentication is complete, the UE 106 may send a configuration request message including a handover attach type to the second network (block 311). In one embodiment, the UE 106 may send a vendor specific network control protocol (VSNCP) message, for example. The VSNCP message may include an attach type that corresponds to a "handover." The configuration request message informs the network to do an IP context transfer between, for example, the packet data network gateway (P-GW) and the evolved packet core (EPC), and the HRPD serving gateway (HSGW) and the evolved access network evolved packet control function (eAN-ePCF) network components. Once the IP address context has been transferred, the UE 106 may access data services using the same IP address, but on the second network (e.g., eHRPD) using a different base station (e.g., 102A) without incurring any data stalls that may have otherwise occurred had the IP address changed (block 313).

In addition to sending the configuration request to the second network, the UE 106 may not send a detach request to the first network. By not sending the detach message, the UE 106 does not lose the allocated evolved packet system (EPS) bearers for all packet data network (PDN) connections because the first network does not know that the UE 106 has left and is looking for another network.

Figure 4:
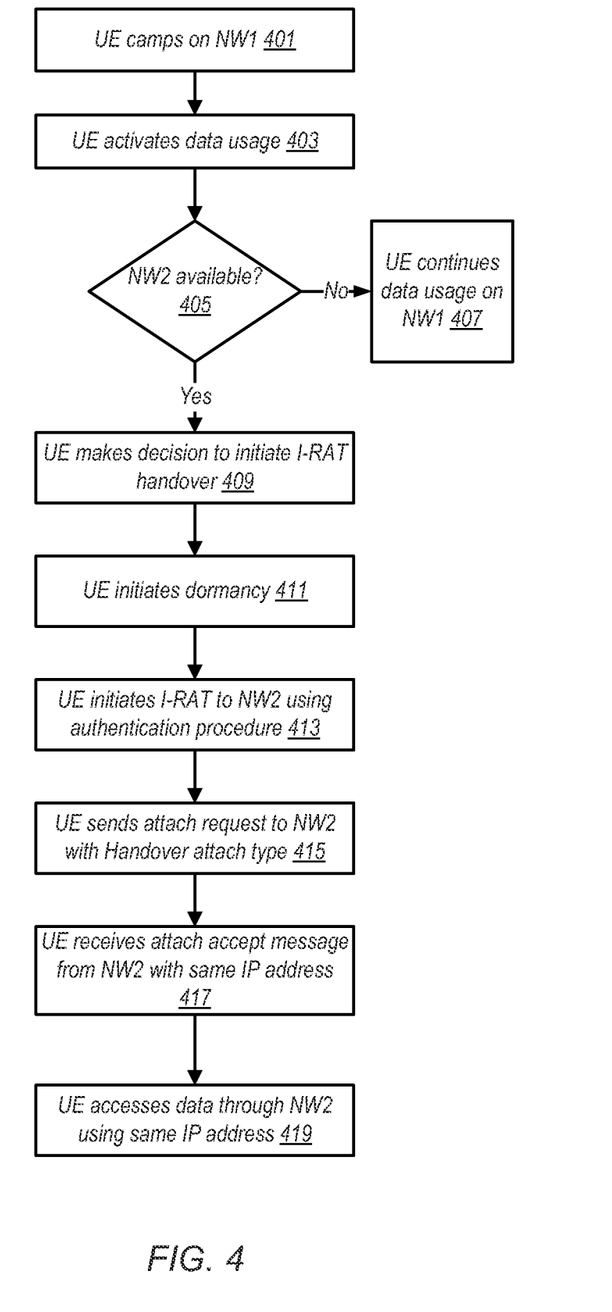
FIG. 4 is a flow diagram depicting the handover operation of another embodiment of the wireless user equipment device shown in FIG. 2.

In FIG. 4, a flow diagram describing the handover operation of another embodiment of the wireless user equipment device shown in FIG. 2 is shown. More particularly, in FIG. 4, a device-initiated upgrade handover procedure is described. Referring collectively to FIG. 1, FIG. 2, and FIG. 4 and beginning in block 401 of FIG. 4, the UE 106 may be operating in an idle state in a first network such as an eHRPD or UMTS network, for example. As described above, a user may not be actively using the UE 106. In such a case, the UE 106 may continue to maintain the connection to the first network, but may not transmit information, except as necessary. In this state, the UE 106 may be "listening" to or "camping" on the connection as described above.

However, if an application is activated or a user initiates an operation, for example, that requires data transfer (block 403), the UE 106 may be configured to determine if a higher data rate network is available (block 405). More particularly, in one embodiment, the UE 106 may have previously downgraded from a network such as an LTE network since the UE 106 was only camping on the LTE connection. However, since the UE 106 must now transfer data, the UE 106 may be configured to upgrade to a network such as the LTE network that was left or a new LTE network, for example, if one is available.

In one embodiment, the UE 106 may store network information within a memory such as memory 206, for example. The network information may include location and characteristics of any number of base stations. For example, in one implementation, network topology, base station locations and characteristics such as RAT, power, providers, and the like may be collected by, for example, a data repository that is in communication with the UE 106 and/or many other UEs whenever they are connected to any network. Accordingly, when a UE 106 is connected, the data repository may also send to the UE 106 the previously harvested and collected network information or a portion of the information. In one embodiment, the data repository may only send network information for base stations that are within some predetermined radius of the geographic location of the UE 106. In other embodiments, the data repository may send to the UE 106 network information for base stations based upon other parameters.

If there is no high data rate (e.g., LTE) network available (block 405), the UE 106 may begin data transfer operations in the first network (block 407). Referring back to block 405, if there is a high data rate (e.g., LTE) network available, the UE 106 may determine that it will upgrade to the high data, rate (e.g., LTE) network (block 409). Accordingly, the UE 106 may initiate dormancy (block 411) and therefore an idle handover. More particularly, the UE 106 may prevent the transfer of data for a predetermined period of time so that the UE 106 may upgrade to the second network.

The UE 106 may be configured to initiate an I-RAT handover to the second network using an authentication procedure as described previously above in conjunction with the description of block 309 of FIG. 3 (block 413). The UE 106 may be configured to send an attach request message to the second network via a mobility management message, for example (block 415). The attach message may include a "handover" attach type, as well as the IP address of the UE 106. If the attach is successful, the UE 106 may be configured to receive from the second network, an attach accept message that includes the same IP address (block 417). The UE 106 may be configured to begin data transfer operations through the second network using the same IP address (block 419).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   a wireless mobile device initiating a connection to a first wireless network that implements a first radio access technology, wherein the first radio access technology is 3rd Generation Partnership Project (3GPP) Long Term Evolution (LTE) technology;
   the wireless mobile device receiving an internet protocol (IP) address from the first wireless network and communicating via the first wireless network using the IP address;
   the wireless mobile device initiating an inter-radio access technology (I-RAT) handover procedure to connect to a second wireless network in response to a determination by the wireless mobile device that the wireless mobile device has been operating in an idle state for longer than a predetermined amount of time, wherein the second wireless network implements a second radio access technology that is different from the first radio access technology, and wherein the initiating the I-RAT handover includes sending a configuration request message to the second wireless network indicating the attach type corresponds to a handover; and
   the wireless mobile device communicating with the second wireless network using the IP address.

2. The method of claim 1, wherein the second radio access technology corresponds is 3rd Generation Partnership Project Two (3GPP2) Enhanced High Rate Packet Data (eHRPD) technology.

3. The method of claim 2, wherein the configuration request message comprises a vendor specific network control protocol (VSNCP) message.

4. The method of claim 1, wherein the second radio access technology is $3^{rd}$ Generation Partnership Project (3GPP) Universal Mobile Telecommunications System (UMTS) technology.

5. The method of claim 1, wherein the predetermined parameters include the wireless mobile device consuming greater than a predetermined amount of power while in the idle state and while connected to the first network.

6. A method comprising:
a wireless mobile device receiving information via a connection with a first wireless network implementing a first radio access technology using a given internet protocol (IP) address;
the wireless mobile device making a determination to connect to a second wireless network implementing a second radio access technology in response to a request to access data via the first wireless network;
the wireless mobile device selecting the second wireless network in response to determining that the second wireless network has a data rate that is higher than the first wireless network;
the wireless mobile device preventing data access via the first wireless network in response to making the determination to connect to the second wireless network;
the wireless mobile device initiating an inter-radio access technology (I-RAT) handover procedure to connect to the second wireless network, wherein the initiating the I-RAT handover includes sending a request message indicating the attach type corresponds to a handover, wherein the preventing data access further comprises initiating a dormancy state for the wireless mobile device for a predetermined amount of time to allow the I-RAT handover; and
the wireless mobile device accessing the data through the second wireless network using the given IP address.

7. The method of claim 6, wherein the second radio access technology is $3^{rd}$ Generation Partnership Project (3GPP) Long Term Evolution (LTE) technology.

8. The method of claim 6, wherein the first radio access technology is $3^{rd}$ Generation Partnership Project Two (3GPP2) Enhanced High Rate Packet Data (eHRPD) technology.

9. The method of claim 6, wherein the first radio access technology is $3^{rd}$ Generation Partnership Project (3GPP) Universal Mobile Telecommunications System (UMTS) technology.

10. The method of claim 6, further comprising determining whether the second wireless network is available, including performing a lookup of available wireless networks within a predetermined distance from the wireless mobile device.

11. The method of claim 6, further comprising determining whether the second wireless network is available, including receiving and analyzing information corresponding to available networks.

12. A method comprising:
a wireless mobile device receiving information via a connection with a first wireless network implementing a first radio access technology using an internet protocol (IP) address received from the first wireless network;
the wireless mobile device determining power consumption can be reduced by connecting to a second wireless network implementing a second radio access technology;
the wireless mobile device initiating an inter-radio access technology (I-RAT) handover procedure to connect to the second wireless network without initiating a detach procedure with the first wireless network responsive to determining power consumption can be reduced;
the wireless mobile device receiving information via a connection with the second wireless network using the IP address;
the wireless mobile device initiating an I-RAT handover procedure to connect to the first wireless network in response to a request to access data via the second wireless network;

prior to initiating the I-RAT handover procedure to connect to the first wireless network, determining whether another network having a data transfer rate that is higher than the second wireless network is available; and
the wireless mobile device accessing data through the first wireless network using the IP address.

13. The method of claim 12, wherein the receiving the information via the connection with the first wireless network further comprises receiving control information from the first wireless network while operating in an idle state.

14. The method of claim 12, wherein the determination by the wireless mobile device that power consumption can be reduced by connecting to the second wireless network includes determining that the wireless mobile device is operating in an idle state and consuming more than a predetermined amount of power.

15. A wireless mobile device comprising:
a receiver/transmitter unit;
a processing unit coupled to the receiver/transmitter unit and configured to:
initiate a connection to a first wireless network implementing a first radio access technology;
receive an internet protocol (IP) address from the first wireless network;
determine power consumption can be reduced by connecting to a second wireless network implementing a second radio access technology, wherein to determine that power consumption can be reduced, the processing unit is further configured to determine whether the wireless mobile device has been operating in an idle state for longer than a predetermined amount of time while connected to the first wireless network;
while remaining attached to the first wireless network, initiate an inter-radio access technology (I-RAT) handover procedure to connect to the second wireless network in response to the determination that power consumption can be reduced;
send a configuration request message indicating the attach type corresponds to a handover;
communicate with the second wireless network using the IP address;
initiate an I-RAT handover procedure to connect to the first wireless network in response to a request to access data via the second wireless network; and
access data through the first wireless network using the IP address.

16. The wireless mobile device of claim 15, wherein the configuration request message comprises a vendor specific network control protocol (VSNCP) message.

17. An apparatus for use in wireless communications, the apparatus comprising:
a receiver/transmitter unit; and
a processing unit coupled to the receiver/transmitter unit and configured to receive information via a connection with a first wireless network implementing a first radio access technology using an internet protocol (IP) address received from the first wireless network;
wherein the processing unit is configured to initiate an inter-radio access technology (I-RAT) handover procedure to connect to a second wireless network implementing a second radio access technology in response to a determination by the processing unit that the wireless mobile device has been operating in an idle state for longer than a predetermined amount of time and without initiating a detach procedure with the first wireless network;

wherein the processing unit is further configured to receive information via a connection with the second wireless network using the IP address;

wherein the processing unit is further configured to initiate an I-RAT handover procedure to connect to the first wireless network in response to a request to access data via the second wireless network; and wherein the processing unit is further configured to access data through the first wireless network using the IP address.

18. The apparatus of claim 17, wherein the first radio access technology is $3^{rd}$ Generation Partnership Project (3GPP) Long Term Evolution (LTE) technology.

19. The apparatus of claim 17, wherein the second radio access technology is to a $3^{rd}$ Generation Partnership Project Two (3GPP2) Enhanced High Rate Packet Data (eHRPD) technology.

* * * * *